United States Patent [19]

Ferrari

[11] Patent Number: 5,125,146
[45] Date of Patent: Jun. 30, 1992

[54] METHOD OF REBUILDING VEHICLE AXLES

[76] Inventor: William J. Ferrari, 1235 Washington Blvd., Pittsburgh, Pa. 15206

[21] Appl. No.: 411,639

[22] Filed: Sep. 25, 1989.

[51] Int. Cl.⁵ .................... B23P 6/00; B23Q 17/00
[52] U.S. Cl. ...................... 29/402.08; 29/402.13; 29/464; 29/407
[58] Field of Search .......... 269/43; 29/402.08, 402.13, 29/464, 407

[56] References Cited

U.S. PATENT DOCUMENTS 3,400,872 9/1968 Rogers ........................ 228/44.5
3,529,339 9/1970 Taurignan ..................... 29/402.08
4,750,662 6/1988 Kagimoto ......................... 269/43
4,792,080 12/1988 Ferrari ........................ 29/402.08

FOREIGN PATENT DOCUMENTS 942622 11/1963 United Kingdom ................ 29/464

Primary Examiner—Robert L. Spruill
Assistant Examiner—Carmine Cuda

[57] ABSTRACT

Method and apparatus are provided which locate and orient a replacement for a damaged axle end on the basis of an opposite, undamaged end, whereupon welding can be carried out to permanently affix the replacement.

7 Claims, 2 Drawing Sheets

METHOD OF REBUILDING VEHICLE AXLES

TECHNICAL FIELD

The invention relates generally to axle repair methods and apparatus and more specifically to such for repairing vehicle axles at the failure site.

BACKGROUND

In my earlier U.S. Pat. No. 4,792,080 I show the use of a special jig in welding an outer bearing surface replacement part to a vehicle axle.

DISCLOSURE OF INVENTION

In my earlier patent I was able to make use of an undamaged inner bearing surface for determining the proper alignment of the outer bearing surface replacement part.

It is an object of this invention to provide solutions suitable for repairs where more than the outer bearing surface has been damaged.

In this invention, an alignment platform is provided which has means for adjusting its location with respect to the axis of the vehicle axle. In addition, gages aid use of the adjustment means for locating the alignment platform with respect to the axle. With the alignment platform properly located, a replacement part is held in place with respect to it for welding to the axle.

MODES OF CARRYING OUT THE INVENTION

FIGS. 1 to 6 illustrate one example of an embodiment of the invention.

Figure 1:
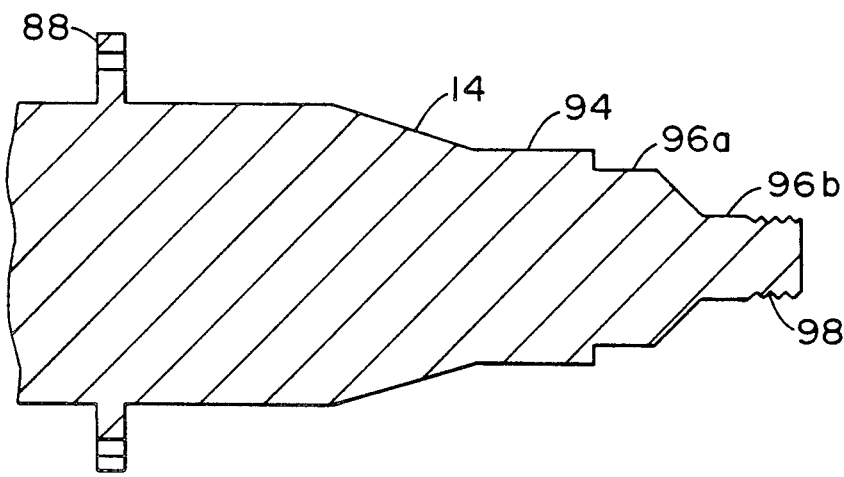
FIG. 1 is an axial cross section of one end of a vehicle axle

FIG. 1 corresponds to FIG. 1 in my above mentioned U.S. Pat. No. 4,792,080, except that in this case the axle is internally solid. It is a trailer axle which is displayed here, rather than a drive axle as illustrated in my earlier patent. This invention is likewise equally applicable, however, to the repair of both drive axles and trailer axles.

With reference to the details of FIG. 1, We see a terminal portion of an axle 14 including a spider flange 88, an oil seal surface 94, an inner bearing surface 96a, an outer bearing surface 96b, and a threaded portion 98 adjacent the terminus of the axle 14.

In this case, for purposes of illustrating the invention, we assume that the axle has been damaged all the way into the oil seal surface.

Even the spider flange may have been warped, although such is still serviceable for brake attachment purposes. In any event, the spider flange, or even a complete flange, is not a reliable part on a axle to use as a locator for placing replacement bearing surfaces.

Figure 2:
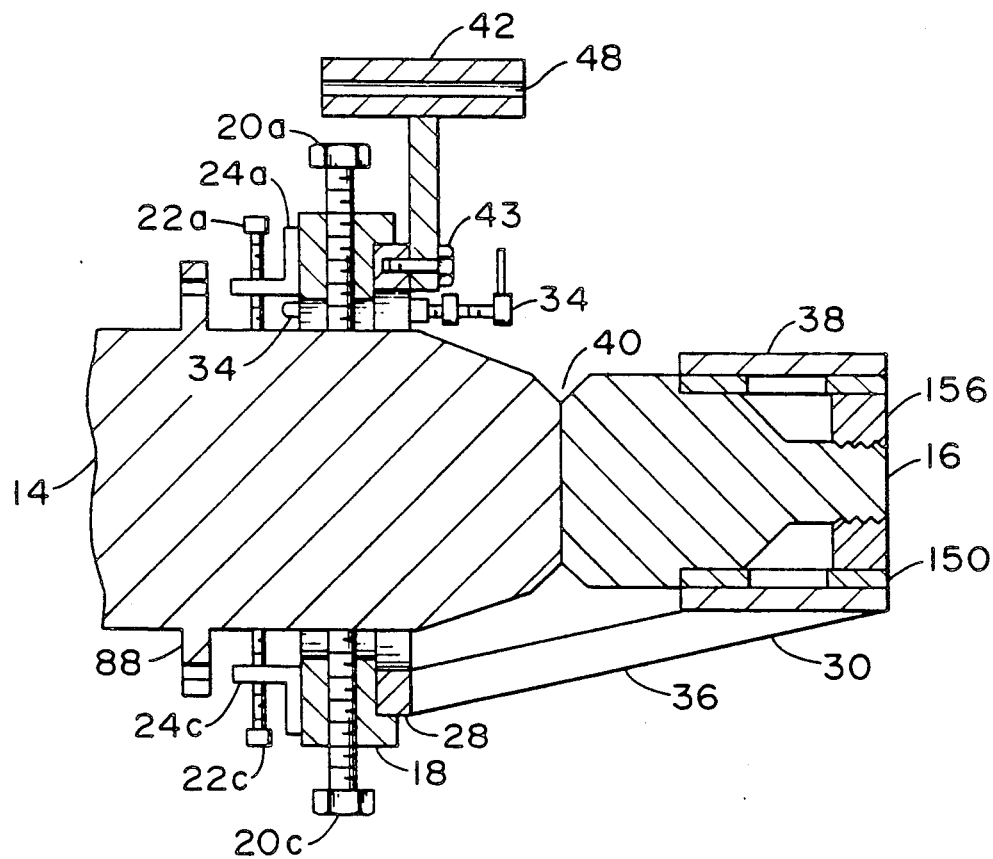
FIG. 2 is a view as in FIG. 1, showing other parts of the invention in combination with the end of a vehicle axle.
Figure 3:
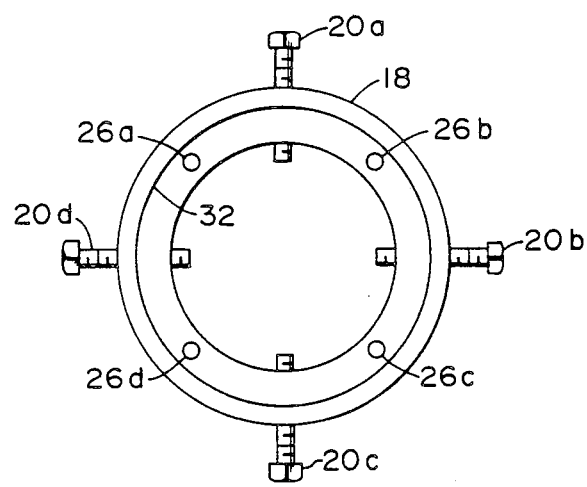
FIG. 3 is a view from the right side of FIG. 2, showing just part of the structure of FIG. 2.
Figure 4:
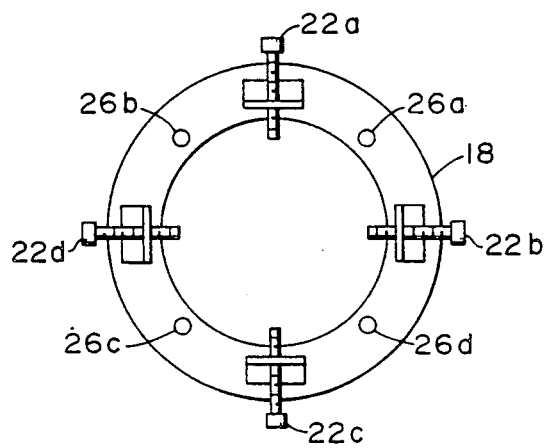
FIG. 4 is a view from the left side of FIG. 2, showing the other side of the part shown in FIG. 3.
Figure 5:
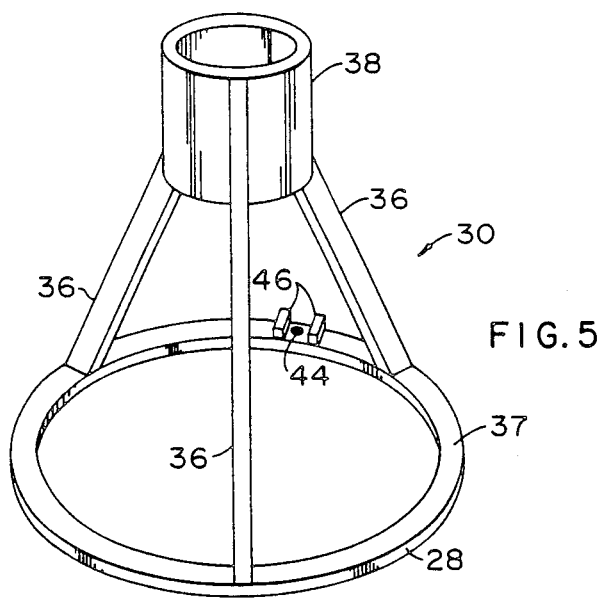
FIG. 5 is a perspective view of a jig shown in FIG. 2.

FIG. 2 shows the case where the axle 14 of FIG. 1 has been cut to remove the damaged portion, and a replacement end portion 16 is being held in position ready for welding in place. Reference should also be made to FIGS. 3 to 5 toward better understanding of the structure shown in FIG. 2.

With further reference to FIG. 2, an alignment platform in the form of ring 18 is situated on axle 14 such that its axis is coaxial with the axis on which the axes of the replacement bearing surfaces must lie. Up and down, back and forth adjustment of the ring is provided by translator bolts 20a to 20d which are threaded and sit in correspondingly threaded bores in the ring at north, south, east and west locations. The inner ends of the bolts contact the axle. The welder adjusts the ring location, for instance, by turning the north bolt for inwards threaded movement while correspondingly turning the south bolt for threaded retraction.

Means for adjusting the tilt of ring 18 are provided by tilt bolts 22a to 22d, which interact with correspondingly threaded bores in angle segments 24a to 24d attached to the ring at north, south, east and west locations. While the compass locations for the translator bolts are shown to coincide with those for the tilt bolts, such is not necessary. The inwards ends of the tilt bolts contact the axle. Tilting is achieved by respectively inwards and outwards turning of opposite bolts.

An alternative means for tilting is provided and can be used, depending on how completely flange 88 is formed as a ring. In this alternative, threaded Allen-head bolts are sunk in correspondingly threaded bores 26a to 26d (FIGS. 3 and 4). The Allen-head bolts are not shown, but, if present, are long enough to reach back into contact with flange 88.

The outer diameter 28 of jig 30 is machined accurately to fit the inner diameter 32 of ring 18. Jig 30 is held in place for instance by a plurality of C-clamps, only one, clamp 34, being shown.

Further with reference to the structure of jig 30, struts 36 extend from base 37 to support a tube 38, whose inner diameter is machined to be coaxial with the axis of the outer diameter 28 and to fit the outer diameter of the jig 150 of my earlier U.S. Pat. No. 4,792,080. Tube 38 may alternatively be cut lengthwise along one side and provided with clamping bolts, in order to facilitate insertion of jig 150 into tube 38, with subsequent tightening using the clamping bolts.

Jig 150 and bushing(s) 156 hold replacement end portion 16 aligned in position against the remainder of axle 14 for welding in place. Edge preparation 40 is shown. The windows of jig 150 are shown but are not used in this invention.

The information necessary for proper adjustment of the translator and tilt bolts of the alignment ring 18 is achieved by means of a gage 42 bolted with bolt 43 in threaded bore 44 between rails 46 (FIG. 5). Gage 42 is provided with a narrow sighting bore 48. While shown at the 12 o'clock position in FIG. 2 for ease of illustration, a better unobstructed view under a truck or trailer might be had at the 6 o'clock position.

Figure 6:
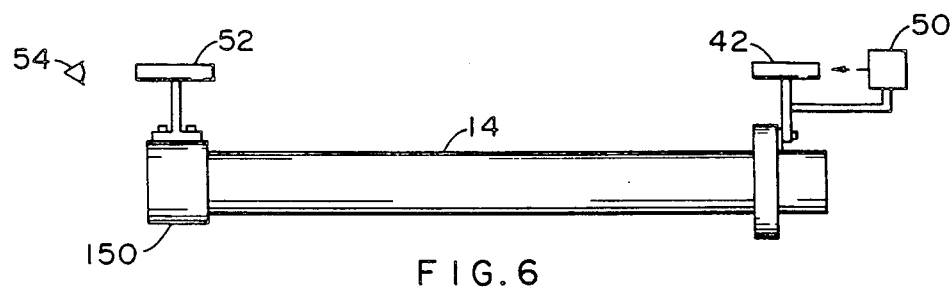
FIG. 6 is a schematic illustrating use of gages to properly align the alignment platform of the invention.

The schematic view of FIG. 6 illustrates use of gage 42 with a light source 50, for instance a laser light source, a jig 150 placed coaxially onto the good inner and outer bearing surfaces at the other good end of the axle 14 and carrying a gage 52 mounted to the outside of the jig 150 at the same radial distance from the bearing surface axis as gage 42 is from the axis of ring 18, and a sensor 54, which may be a human, for detecting when the sighting bores are aligned to pass light from the light source. The operation of adjusting the translator and tilt bolts Will best be done with replacement portion 16 not yet in place, in order to make the turning of the bolts easier. When alignment is proper at, for instance, the 6 o'clock position of the gages, the C-clamps 34 are then loosened and jig 30 brought to the 3 or 9 o'clock position, in order to refine tilt of ring 18.

The gages may likewise be used in the case of bearing surfaces which are set at some angle with respect to the axle axis, in order to introduce a desired amount of camber to the wheels. In this case, the sighting bores are correspondingly rotated amounts equal to the camber, before carrying out the sighting.

Other means of guiding adjustment of the adjustment means, besides the sighting gages discussed above, may be used. For instance, a concentric, undamaged surface, e.g. an undamaged surface 94, may be available for using a dial gage relative to machined surfaces on the ring 18, for instance the surface of diameter 32.

I claim:

1. A method of vehicle axle repair in the case of an axle having a first, damaged end and a second, undamaged end, comprising removing the damaged end to leave a third end, and locating and orienting a replacement for the damaged end at the third end on the basis of the second, undamaged end by use of a gage connected to or placed on said second, undamaged end.

2. A method as claimed in claim 1, the locating and orienting being accomplished by locating and orienting a plateform on the basis of the second undamaged end and holding the replacement in place in fixed relationship with respect to the platform.

3. A method as claimed in claim 1, wherein the locating and orienting comprises sensing the second, undamaged end under a vehicle.

4. A method as claimed in claim 1, the locating and orienting including use of an alignment device, said alignment device comprising a platform, translating means for translating the platform with respect to said axle, and tilt means for tilting the platform also with respect to said axle.

5. A method as claimed in claim 4, further comprising combining the use of the alignment device with use of a jig for holding a replacement portion of an axle.

6. A method as claimed in claim 4, the platform comprising a ring, the translating means and tilt means carrying out their functions by contact with an axle within the ring.

7. A method as claimed in claim 6, further comprising placing the alignment device on the vehicle axle.

* * * * *